Figure 1:
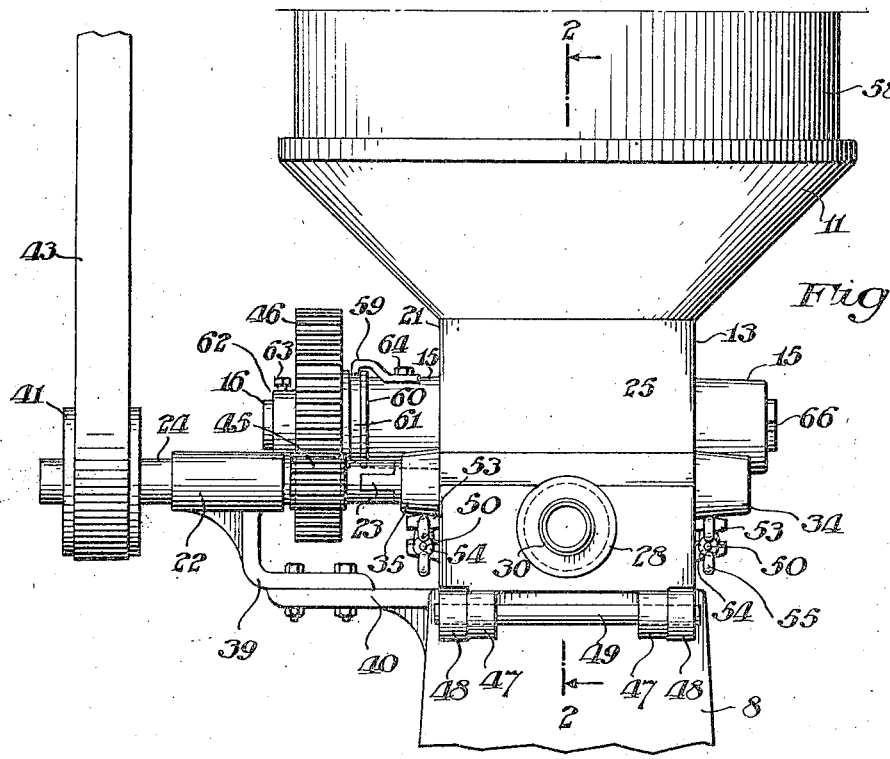

Oct. 2, 1923.  1,469,377

D. BRIGHTBILL

SAUSAGE STUFFING MACHINE

Filed Feb. 8, 1922  3 Sheets-Sheet 1

Inventor
David Brightbill

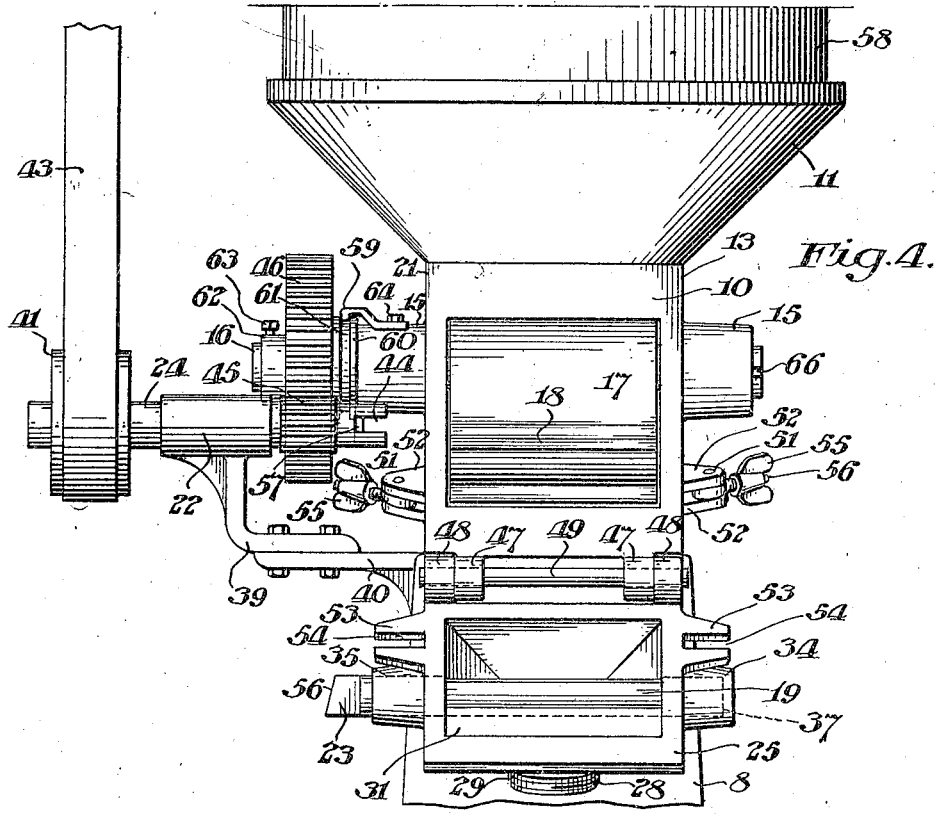
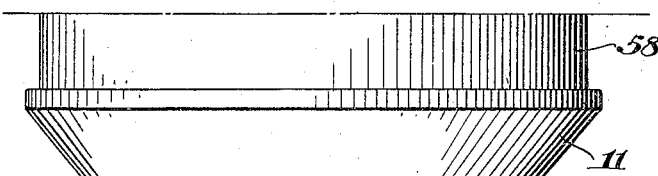

Patented Oct. 2, 1923.

1,469,377

UNITED STATES PATENT OFFICE.

DAVID BRIGHTBILL, OF LEBANON, PENNSYLVANIA.

SAUSAGE-STUFFING MACHINE.

Application filed February 8, 1922. Serial No. 534,978.

*To all whom it may concern:*

Be it known that I, DAVID BRIGHTBILL, a citizen of the United States, and a resident of the city of Lebanon, county of Lebanon, and State of Pennsylvania, have invented certain new and useful Improvements in Sausage-Stuffing Machines, of which the following is a specification.

The invention relates to sausage stuffing machines of the rotary continuous-feed type, wherein the minced meat is deposited in a forcing chamber, and thence continuously conveyed and driven outwardly under pressure through a suitable outlet into the skins. The main object of the invention is to supply a sturdy, durable and efficient device of this kind, made up of relatively few, strong and simple parts, all capable of economic production.

Another object of the invention is to provide means in connection with a machine of this type for opening the forcing chamber in such a manner as to completely expose the interior parts and surfaces thereof so that such parts and surfaces as well as the meat driving and conveying mechanism within the chamber, may be quickly and easily accessible for the purpose of cleaning the same and applying rust preventatives thereto. At the present time the making of sausage, bologna and other kindred food products is almost universally conducted under the restrictions and regulations of pure food and other sanitation laws, and a customary and usual requirement of such laws with respect to the use of stuffing machines is that all the mechanism and parts thereof which come into contact with the meat be frequently washed and cleaned, and all particles of meat or other substances adhering thereto be scraped off or otherwise removed, the rules in some instances calling for the use of boiling water or other purifying and disinfecting liquids or solutions. In view of these conditions and requirements it has become desirable that the enclosed members of these machines, such as the pressure chamber or casing in the present embodiment, be so made as to be capable of being readily and quickly laid open and the meat conveying elements so far as possible either removed therefrom or rendered completely accessible without the exercise of undue skill or effort. It is accordingly one of the purposes of this invention to meet this requirement by providing a removable wall for the pressure chamber, said wall being outwardly hinged to the chamber casing in the manner of a door plate, and the same carrying therewith one of the meat conveying members, so that the wall may be readily removed and again replaced on the chamber without the necessity of detaching the same bodily from the machine, and that the meat conveying members may be thrown out of engagement and again returned to their normal cooperative positions by a few very simple movements on the part of the operator.

Other purposes and objects of the invention will appear from the following description taken in connection with the accompanying drawings in which:—

Figure 2:
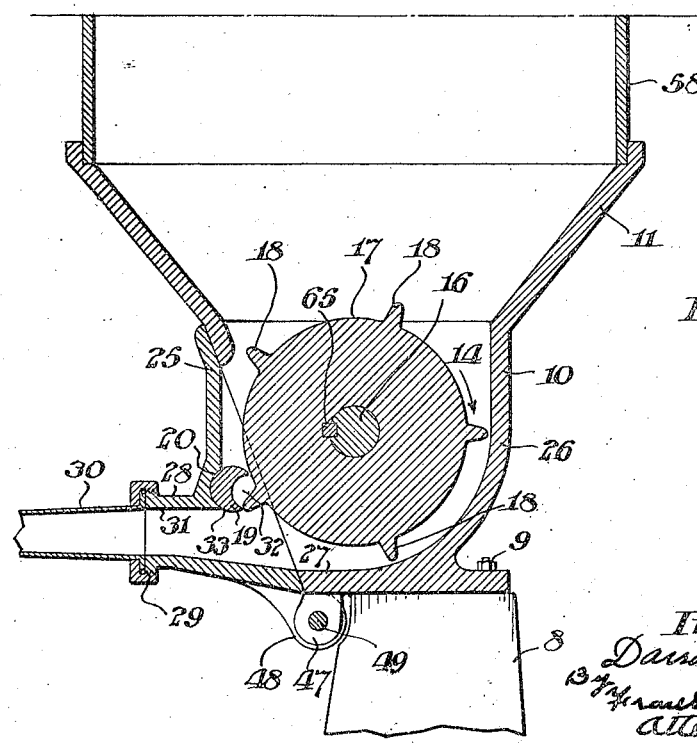
Figure 3:
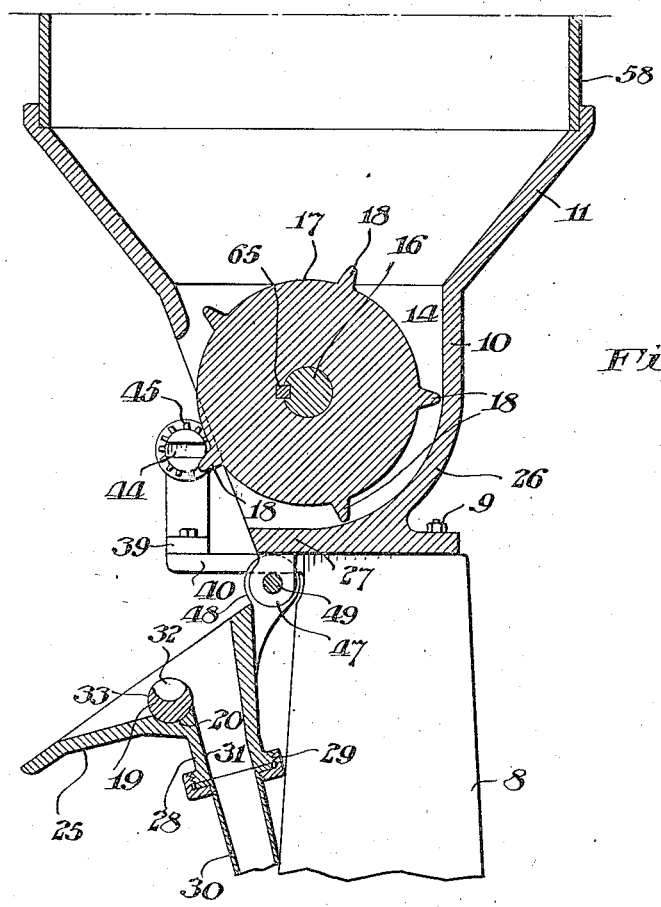
Figure 6:
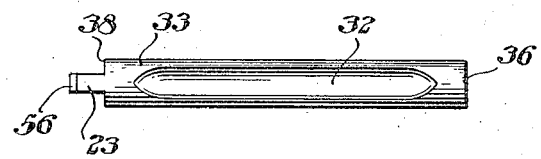
Figure 7:
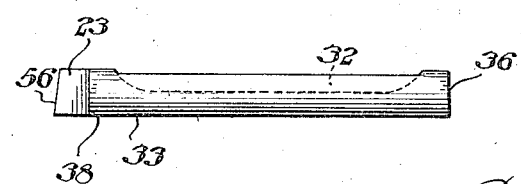

Figure 1 is a front elevational view of a machine embodying my invention. Fig. 2 is a vertical sectional view thereof on line 2—2 of Fig. 1. Fig. 3 is a similar view to that shown in Fig. 2, showing the front wall of the pressure chamber removed and thrown downwardly on the hinge to remote open position. Fig. 4 is a view similar to Fig. 1, likewise showing the pressure chamber wall in remote open position. Fig. 5 is a side elevational view with a portion of the driving mechanism broken away to show the gearing, and Figures 6 and 7 are plan and side views respectively of a lunette constituting one of the meat conveying parts.

Referring more particularly to the drawings, the numeral 8 indicates a base or frame whereon is supported and secured, as by bolts 9, the casing 10, having an outwardly flared upper portion 11 in the shape of a hopper or funnel, and a restricted lower portion made with substantially vertical side walls 13 and 21, front and rear walls 25 and 26, and a bottom 27, forming a pressure chamber 14. An outlet nozzle 28 is provided in the front wall 25 adjacent the bottom 27 for the conveyance of the meat outwardly from the chamber into the skins, the mouth of the nozzle being externally threaded as at 29 for the adjustment thereto of a spout 30 of the kind commonly used for this purpose. Journaled in hubs 15, 15, externally formed on the side walls 13 and 21, is a horizontal shaft 16 extending centrally through the chamber and slidably secured thereto by means of a key 65 is the cylindrical rotor or drum 17 having one or more radially extending wings or teeth 18 designed to loosely mesh with a lunette 19 disposed for rotation in an appropriately formed grooved seat 20 extending across the inner face of the front wall 25 immediately above and in substantial alignment with the upper wall 31 of the nozzle outlet, said lunette bridging and effectually sealing the space between the front wall and the drum against the passage of the meat.

In the present instance the lunette is formed by cutting a groove 32 of substantially semi-circular cross-sectional outline in a shaft 33, the groove being of sufficient longitudinal extent to accommodate the teeth, and the same terminating short of the ends of the shaft whereby the terminal portions of the shaft are adapted to be journaled in bearings formed in hubs 34 and 35 externally provided on opposite sides of the casing, the end 36 of the shaft being squared and abutting against the closed end 37 of the hub 34 to prevent lateral dislocation, and the opposite end 38 thereof projecting through the hub 35 and having a central flattened extension forming a coupling member 23. A short drive shaft 24, journaled in a bearing 22 on an arm 39 secured to a bracket 40 on the side wall 21 of the casing, carries at its outer end a pulley 41 for the transmission of rotary movement to the machine, as by a drive belt 43 connected with a motor or other source of power, a slot 44 centrally cut in the inner end of said shaft forming a coupling member adapted to receive and co-operate with the coupling member 23 of the lunette shaft 33, and a pinion 45 on the drive shaft engaging a suitable gear 46 on the drum shaft 16. The pinion 45 and gear 46 are appropriately proportioned to so control the relative rotative movement of the drum and lunette as to cause the teeth 18 of the former to mesh with the groove 32 of the latter and thus permit the teeth to freely pass by the abutment constituted by the lunette against the passage of the meat.

For the purpose of permitting quick and easy access to the interior of the machine for the purpose hereinbefore referred to, the front wall 25 of the casing together with the adjoining front portions of the side walls thereof carrying the bearing hubs 34 and 35 of the lunette, are, in the present invention, made in the form of an integral plate separate and apart from the casing proper, so as to be bodily removable therefrom, and, as such, are hingedly attached to the lower part of the casing by means of a hinge pin 49 passing through perforated lugs or ears 47, 47 and 48, 48 depending from the lower parts of the casing and the wall respectively.

The wall 25 is thus adapted to operate in the manner of a door plate to cover and close the front of the casing, and convenient means for securing it tightly in working position against the casing are provided, which means are of such a character as to enable the wall to be quickly and conveniently unfastened and removed or restored to place and again made fast. In the present instance the securing means comprise swinging bolts, 50, 50, each of which is mounted upon a pivot 51 between a pair of lugs 52, 52, on the exterior of the side walls 13 and 21, the front wall 25 having laterally projecting lugs 53, 53, with open notches 54, 54, to receive the threaded stems of the bolts, wing nuts 55, 55, being provided on the stems for tightly drawing up the plate against the casing.

Figures 1 and 2 show the casing as it appears when closed with the bolts 50, 50 in their normal positions, the stems thereof occupying the notches 54, 54 on the edges of the wall plate, and the nuts 55, 55 tightened up against the casing, the wall plate being thus locked and clamped securely in place. It will be observed that the form of securing means illustrated is especially contrived and adapted to withstand the internal pressure exerted against the front wall 25, to retain the lunette in its appropriate operative position with respect to the drum, to prevent the escape of meat from the casing through the joint between the latter and the wall plate, and to retain the lunette shaft in its coupled relations with the drive shaft 24. At the same time, all that is necessary to be done in order to remove the wall plate and thus open the casing, is to slacken up the nuts 55, 55, and swing the bolts 50, 50 outward, when the plate will be unfastened, and by slightly revolving the drive shaft so as to bring the slot 44 therein to such position as will permit the forward withdrawal of the extension 23 of the lunette shaft from the slot, the plate will be free to be swung forwardly and downwardly on the hinge pin 49 to open position as shown in Figures 3 and 4. When the wall plate is in such open position, the lunette shaft may, with very slight exertion, be bodily withdrawn from its seat and bearings by simply pulling it out by its projecting end, and after such removal the seat and bearings of the shaft and all interior surface of the wall plate may be easily reached and thoroughly washed, scraped and cleaned. The drum 17 will also, in such open position of the wall plate, be almost entirely exposed and the interior walls and bottom of the casing made accessible for cleaning. To return the wall plate to its closed position on the casing it is only necessary to restore the lunette to its bearings and swing the plate upwardly, adjusting the lunette shaft so that the coupling member thereof will enter the notch in the drive shaft, when the plate may be brought home and clamped in place by the swinging bolts 50, 50. To insure the requisite engagement of the lunette shaft with the drive shaft so that the teeth of the drum will properly mesh with the groove of the lunette, the end 56 of the extension 23 of the lunette shaft and the bottom 57 of the notch in the drive shaft are correspondingly beveled or made slightly angular, so that the coupling of the members can be effected in no other than the appropriate way.

In order that the best results may be realized in the use of this machine it is desirable that the rear wall 26 of the casing be made substantially vertical from a point approximately at the height of the axis of the drum shaft 16 upwardly to the hopper 11 and that the same be concaved to conform with the circular path described by the teeth of the drum from such point downwardly to the bottom 27 of the casing, there being but slight clearance allowed between the teeth and the inner face of the wall, and it is likewise desirable that the teeth 18 of the drum be made relatively narrow in cross section and be otherwise so formed as to mesh loosely with the lunette, and so that the teeth in passing through the crescent, while constantly contacting transversely along one line, will occupy only a limited portion of the space afforded by the groove, thus obviating the tendency of the teeth to crush and compress the meat which collects in the groove and enabling the same to be swept, rather than squeezed, out.

To facilitate the more thorough cleaning of the drum and the interior surfaces of the pressure chamber, as may occasionally be desired, provision is made for the removal of the drum and the drum shaft 16 from the machine without taking off the gear wheel 46 or disturbing the same in its meshed relation to the pinion 45 and for permitting the prompt and accurate restoration of said parts to their proper engaging positions with relation to the lunette 33. The means provided for this purpose comprise a circular flange 60 concentrically formed on the inner side of the gear 46, said flange being adapted to receive the outer end of the hub 15 therein, and having an external peripheral groove 61 for the free reception of a retaining finger 59 secured to the hub 15 by a bolt 64. A set screw 63 is threaded in a hub 62 formed on the opposite side of the gear and is adapted to enter a shallow socket (not shown) in the shaft to secure the gear in appropriate position to the shaft, while a keyway 66 in the latter accommodates the key 65 secured to the drum and extends outwardly to the end of the shaft opposite the gear to permit the endwise withdrawal of the shaft through the gear 46. With this construction it will be clear that by loosening the set screw 63 and elevating it sufficiently to clear the shaft, the latter may be pulled out and removed from the machine, leaving the drum free to be lifted out through the hopper, the gear 46 being retained in supported position on the hub 15 and left undisturbed in its meshed relation to the pinion 45. It will also be apparent that the restoration of the drum and the shaft may be quickly effected and the parts thereafter quickly and accurately replaced in their normal operative positions through the insertion of the set screw into the shaft socket.

In the operation of the device, the minced meat is deposited in the hopper 11, which through the aid of the hopper extension 58 seated thereon, is designed to receive and hold a considerable quantity thereof, thereby relieving the operator of the necessity of constantly filling the same. The mechanism being now set in motion through the application of power to the drive shaft, the drum rotates in the direction indicated by the arrow in Figure 2, carrying the meat as the same descends thereon from the hopper, downwardly into the chamber, and out through the nozzle 28 into the skins, the teeth 18 of the drum passing in turn by the lunette 33, but all of the meat, with the exception of such small portion thereof as is caught in the lunette owing to the free meshing of the teeth therewith as hereinbefore explained, being driven forwardly into the outlet.

When it is desired to clean the machine, the front wall plate is loosened and swung down on its hinge in the manner previously indicated, and thence subsequently again restored to its normal closed position.

Having thus described my invention, I claim as new and desire to secure by Letters Patent:

1. In a sausage stuffing machine, the combination with a meat pressure chamber including a wall with an outlet therein, of a drum having teeth and mounted to rotate within the chamber to apply pressure to the meat, and a lunette rotatively disposed in the path of the teeth and geared to mesh therewith, said lunette being seated in said wall and acting as an abutment against the passage of the meat and serving to direct the meat into the outlet.

2. In a sausage stuffing machine, the combination with a meat pressure chamber including a wall with an outlet therein, of a drum having teeth and mounted to rotate within the chamber to apply pressure to the meat in the direction of the outlet, and a lunette geared to mesh with the teeth of the drum rotatively seated in said wall and disposed in the path of the teeth between the drum and said wall.

3. In a sausage stuffing machine, the combination with a meat pressure chamber including a wall with an outlet therein, of a drum having teeth and mounted to rotate within the chamber to apply pressure to the meat in the direction of the outlet, and a lunette geared to mesh with the teeth of the drum, and rotatively seated in said wall and projecting inwardly therefrom to bridge the opening between said wall and the drum to prevent the passage of the meat through said opening.

4. In a sausage stuffing machine, the combination with a meat pressure chamber open at the top and having rear and side walls, and rotary meat conveying means within the chamber, of a front wall having an outlet nozzle, said wall be formed separate from the chamber but being hingedly attached thereto.

5. In a sausage stuffing machine, the combination with a meat pressure chamber having a removable wall, of rotary meat conveying means within the chamber, one member of said meat conveying means being journaled in said wall and being disposed therein to permit disengagement of said conveying means through the removal of said wall.

6. In a sausage stuffing machine, the combination with a meat pressure chamber having a removable wall hingedly attached to the body of the chamber, of coacting rotary meat conveying members within the chamber, one of said members being journaled in said wall and being disposed therein to permit engagement and disengagement with its co-operative members through the swinging of said wall on its hinge.

7. In a sausage stuffing machine, the combination with a meat pressure chamber having a removable wall hingedly attached to the body thereof, of two co-acting rotary meat conveying members within the chamber, said members being driven and rotatively controlled by gears disposed externally of said chamber, one of said members being internally journaled and so disposed in said wall and being outwardly so coupled with the driving and controlling mechanism as to permit of complete engagement and disengagement, both with its co-operative meat conveying member and with the driving and controlling mechanism, through the swinging of said wall on its hinge.

8. In a sausage stuffing machine, the combination with a meat pressure chamber having a removable wall hingedly attached to the body thereof for closing the front of the chamber, of a drum having teeth and journaled in the walls of the chamber and adapted to rotate therein, and a lunette journaled and seated in the removable wall and adapted to mesh with the teeth of the drum, gearing and driving mechanism disposed externally of the chamber for actuating and controlling the relative rotation of said drum and said lunette, and detachable coupling means between said lunette and said driving and coupling mechanism, said lunette and said coupling means being so formed and disposed relative to said drum and said mechanism respectively as to permit free engagement and disengagement of the lunette and its coupling members therewith through the swinging of said wall upon its hinge.

9. A sausage stuffing machine comprising a meat pressure chamber having a removable hinged wall and rotary means within the chamber for applying pressure to the meat, said means including a rotary member in the form of a shaft journaled and seated in said removable wall, said member being adapted to be freely and bodily withdrawn from said wall when the latter is in open position with respect to the chamber.

10. A sausage stuffing machine, comprising a meat pressure chamber having two inter-meshing rotary meat conveying members therein, gears disposed externally of the chamber for actuating said members and controlling the rotative relation thereof, and means for permitting the removal of either one or both said members bodily from the chamber and again restoring the same to their appropriate co-operative relation therein without removing said gears or disturbing the meshed relation thereof.

In testimony whereof I affix my signature.

DAVID BRIGHTBILL.

In presence of—
Wm. M. Haak,
Ralph H. Behney.